United States Patent
Takayama et al.

(10) Patent No.: US 6,639,629 B1
(45) Date of Patent: *Oct. 28, 2003

(54) CAMERA HAVING PHOTOGRAPHING ELEMENTS FOR PHOTOELECTRICALLY CONVERTING OPTICAL IMAGE INTO IMAGE SIGNALS

(75) Inventors: Jun Takayama, Hachioji (JP); Yukinori Koizumi, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/063,922

(22) Filed: Apr. 22, 1998

(30) Foreign Application Priority Data

Apr. 25, 1997 (JP) .............................................. 9-109836

(51) Int. Cl.⁷ ......................... H04N 5/225; H04N 5/238
(52) U.S. Cl. ...................... 348/364; 348/342; 348/368; 348/296
(58) Field of Search ................................ 348/207, 222, 348/223, 224, 228, 229, 230, 272, 273, 335, 342–344, 362–369, 222.1; 359/722, 723, 738, 739; 396/213, 227, 241, 246; H04N 5/268, 5/225

(56) References Cited

U.S. PATENT DOCUMENTS

| | | | | | |
|---|---|---|---|---|---|
| 5,091,795 A | * | 2/1992 | Nishioka | ........................ | 349/1 |
| 5,225,936 A | * | 7/1993 | Sugiura | ....................... | 359/679 |
| 5,463,496 A | * | 10/1995 | Ise | ............................. | 359/497 |
| 5,568,197 A | * | 10/1996 | Hamano | ..................... | 348/342 |
| 5,801,773 A | * | 9/1998 | Ikeda | ....................... | 348/229.1 |
| 5,834,761 A | * | 11/1998 | Okada | ..................... | 250/208.1 |
| 5,959,669 A | * | 9/1999 | Mizoguchi | .................. | 348/362 |
| 6,040,857 A | * | 3/2000 | Hirsh | ......................... | 348/342 |
| 6,088,059 A | * | 7/2000 | Mihara | ....................... | 348/335 |
| 6,111,608 A | * | 8/2000 | Koizumi | .................... | 348/342 |
| 6,122,009 A | * | 9/2000 | Ueda | ......................... | 348/335 |
| 6,351,332 B1 | * | 2/2002 | Okuyama | .................. | 359/558 |

* cited by examiner

*Primary Examiner*—Ngoc-Yen Vu
(74) *Attorney, Agent, or Firm*—Finnegan, Henderson, Farabow, Garrett & Dunner, L.L.P.

(57) ABSTRACT

A camera is provided with a lens for focusing an optical image of a subject onto an image focusing surface; photographing elements, provided on the image focusing surface, for photoelectrically converting the optical image into image signals, the photographing elements arranged with an arrangement pitch not larger than 7.0 μm; and a diaphragm having a photographing aperture through which the optical image enters into the photographing elements, the diaphragm adjusting the area of the photographing aperture so as to control a light amount of the optical image, wherein when the diaphragm adjusts the photographing aperture so as to have the smallest area, F-number is smaller than 5.6.

10 Claims, 8 Drawing Sheets

CAMERA HAVING PHOTOGRAPHING ELEMENTS FOR PHOTOELECTRICALLY CONVERTING OPTICAL IMAGE INTO IMAGE SIGNALS

BACKGROUND OF THE INVENTION

The present invention relates to a camera having a solid image pick-up element as a image receiving means, and specifically, to a camera having a solid image pick-up element as a image receiving means in which an image obtained through a picture-taking lens is received by a solid image pick-up element and a still image is processed as digital data.

A camera having a solid image pick-up element as a image receiving means photoelectrically converts an image obtained through a picture-taking lens by a solid image pick-up element such as a CCD, and the obtained image signal is processed as digital data.

Recently, in order to increase resolution, the density of pixels of the CCD is highly increased, and at the same time, the size of the CCD is being reduced. As a result, a pitch of the pixel of the CCD is greatly reduced.

Further, as a means for increasing the image quality, a stop (a diaphragm with an aperture) is used to optimize a quantity of light entering into the CCD, in the same manner as in a common silver halide film camera.

As described above, in a camera in which a solid image pick-up element using the CCD with a small pixel pitch is applied to an image receiving means, it was considered that the high resolution is obtained as an increase of the number of pixels of the CCD and the image quality is increased.

However, the following has been found: when a small aperture is applied to limit the quantity of light entering into the CCD, diffraction is generated, thereby, MTF characteristics of the picture taking optical system are deteriorated, and the resolution and contrast of the obtained image are lowered, resulting in hindrance of an increase of the image quality.

SUMMARY OF THE INVENTION

Accordingly, the object of the present invention is to realize a camera having a solid image pick-up element as a image receiving means which does not deteriorate the image quality even when a stop is used to limit the quantity of light.

As a result of deep consideration relating to the above-described problems, it has been discovered that a specific relationship is realized between the pixel pitch of the solid image pick-up element and stop value (F-number) relating to the image quality, and a new structure has been found in which the image quality is not deteriorated even when the stop is used to limit the quality of light.

(1) A camera having a solid image pick-up element as a image receiving means comprising a picture taking lens which structures an optical system to form an image of the object on the image forming surface; a stop means which controls an aperture area and controls the quantity of light entering to the image forming surface; and a solid image pick-up element which is provided at the position of the image forming surface of the picture taking lens and photoelectrically converts the image obtained by the picture taking lens and generates an image signal, the camera having a solid image pick-up element as a image receiving means is characterized in that the pixel pitch of the solid image pick-up element is not larger than 7.0 $\mu$m, and the stop value (F-number) at the minimum aperture of the stop means is smaller than 5.6.

In a camera having a solid image pick-up element as a image receiving means, when the pixel pitch of the solid image pick-up element is not larger than 7.0 $\mu$m, the stop value at the time of the minimum aperture of the stop means is not larger than 5.6, and as the result, even when the stop is used to limit the quantity of light, a decrease of the resolution and contrast due to the influence of the diffraction can be suppressed to the minimum, and thereby, a camera having a solid image pick-up element as a image receiving means which does not deteriorate the image quality can be realized.

(2) A camera having a solid image pick-up element as a image receiving means comprising a picture taking lens which structures an optical system to form an image of the object on the image forming surface; a stop means which controls an aperture area and controls the quantity of light entering to the image forming surface; a solid image pick-up element which is provided at the position of the image forming surface of the picture taking lens and photoelectrically converts the image obtained by the picture taking lens and generates an image signal; and a signal processing means to process the image signal, the camera having a solid image pick-up element as a image receiving means is characterized in that, when the pixel pitch of the solid image pick-up element is not larger than 7.0 $\mu$m and the stop value of the stop means not smaller than 5.6, the signal processing means conducts processing to emphasize the high frequency component of the image signal.

In the camera having a solid image pick-up element as a image receiving means, when the pixel pitch of the solid image pick-up element is not larger than 7.0 $\mu$m, and the stop value at the time of the minimum aperture of the stop means is not smaller than 5.6, processing to emphasize the high frequency component of the image signal is conducted, and as the result, even when a stop whose value is not smaller than 5.6, is used to limit the quantity of light, a decrease of the resolution and contrast caused by a decrease of the high frequency component due to the influence of the diffraction can be suppressed to the minimum, and thereby, a camera having a solid image pick-up element as a image receiving means which does not deteriorate the image quality can be realized.

As the result, even when a stop is used to limit the quantity of light, a decrease of the resolution and contrast due to the influence of the diffraction can be suppressed to the minimum, and thereby, a camera having a solid image pick-up element as a image receiving means which does not deteriorate the image quality can be realized.

In this connection, when such the image signal processing is conducted, by changing the degree of emphasis of the high frequency component corresponding to the stop value of the stop means, the deterioration of MTF caused by the diffraction generated corresponding to the stop value (by stopping down), can be compensated.

(3) A camera having a solid image pick-up element as a image receiving means comprising a picture taking lens which structures an optical system to form an image of the object on the image forming surface; a quantity of light control means which controls the quantity of light entering to the image forming surface; a solid image pick-up element which is provided at the position of the image forming surface of the picture taking lens and photoelectrically converts the image obtained by the picture taking lens and generates an image signal; and a signal processing means to process the image signal, the camera having a solid image pick-up element as a image receiving means is characterized in that the pixel pitch of the solid image pick-up element is not larger than 7.0 μm; the quantity of light control means is composed of the first quantity of light control means which controls the aperture area and controls the quantity of incident light, and the second quantity of light control means to control the quantity of incident light without depending on the aperture area; and the stop value at the time of minimum aperture of the first quantity of light control means is not larger than 5.6

In the camera having a solid image pick-up element as a image receiving means, when the pixel pitch of the solid image pick-up element is not larger than 7.0 μm, the stop value at the time of the minimum aperture of the first quantity of light control means is not larger than 5.6, and the second quantity of light control means to control the quantity of light without depending on the aperture area is used jointly with the first quantity of light control means. As the result, even when a quantity of light control means is used to limit the quantity of light, a decrease of the resolution and contrast due to the influence of the diffraction can be suppressed to the minimum, and thereby, a camera having a solid image pick-up element as a image receiving means which does not deteriorate the image quality can be realized.

Further, by using the second quantity of light control means without depending on the aperture area, sufficient resolution and contrast can be obtained even when the camera is used in the bright environment.

(4) A camera having a solid image pick-up element as a image receiving means comprising a picture taking lens which structures an optical system to form an image of the object on the image forming surface; a quantity of light control means which controls the quantity of light entering to the image forming surface; a solid image pick-up element which is provided at the position of the image forming surface of the picture taking lens and photoelectrically converts the image obtained by the picture taking lens and generates an image signal; and a signal processing means to process the image signal, the camera having a solid image pick-up element as a image receiving means is characterized in that the pixel pitch of the solid image pick-up element is not larger than 7.0 μm; the quantity of light control means is composed of the first quantity of light control means which controls the aperture area and controls the quantity of incident light, and the second quantity of light control means to control the quantity of incident light without depending on the aperture area; and when the quantity of light is further limited under the condition that the stop value of the first quantity of light control means is not smaller than 5.6, the quantity of light control by the second quantity of light control means is used jointly.

In the camera having a solid image pick-up element as a image receiving means, when the pixel pitch of the solid image pick-up element is not larger than 7.0 μm, in the case where the quantity of light is further limited under the condition that the stop value of the first quantity of light control means is not smaller than 5.6, the second quantity of light control means to control the quantity of light without depending on the aperture area is used jointly with the first quantity of light control means. As the result, even when a quantity of light control means is used to limit the quantity of light, a decrease of the resolution and contrast due to the influence of the diffraction can be more suppressed than in the case of a single stop depending on the aperture area, and thereby, a camera having a solid image pick-up element as a image receiving means which does not deteriorate the image quality can be realized.

Further, by using the second quantity of light control means without depending on the aperture area, sufficient resolution and contrast can be obtained even when the camera is used in the bright environment.

DETAILED DESCRIPTION OF THE PREFERRED EMBODIMENT

An example of the present invention will be detailed below. In this connection, an electronic still camera will be explained as an example of a camera having a solid image pick-up element as a image receiving means.

[Structure of an Electronic Still Camera]

Initially, referring to FIG. 1, the structure of an electronic still camera used in the present example will be explained.

Figure 1:
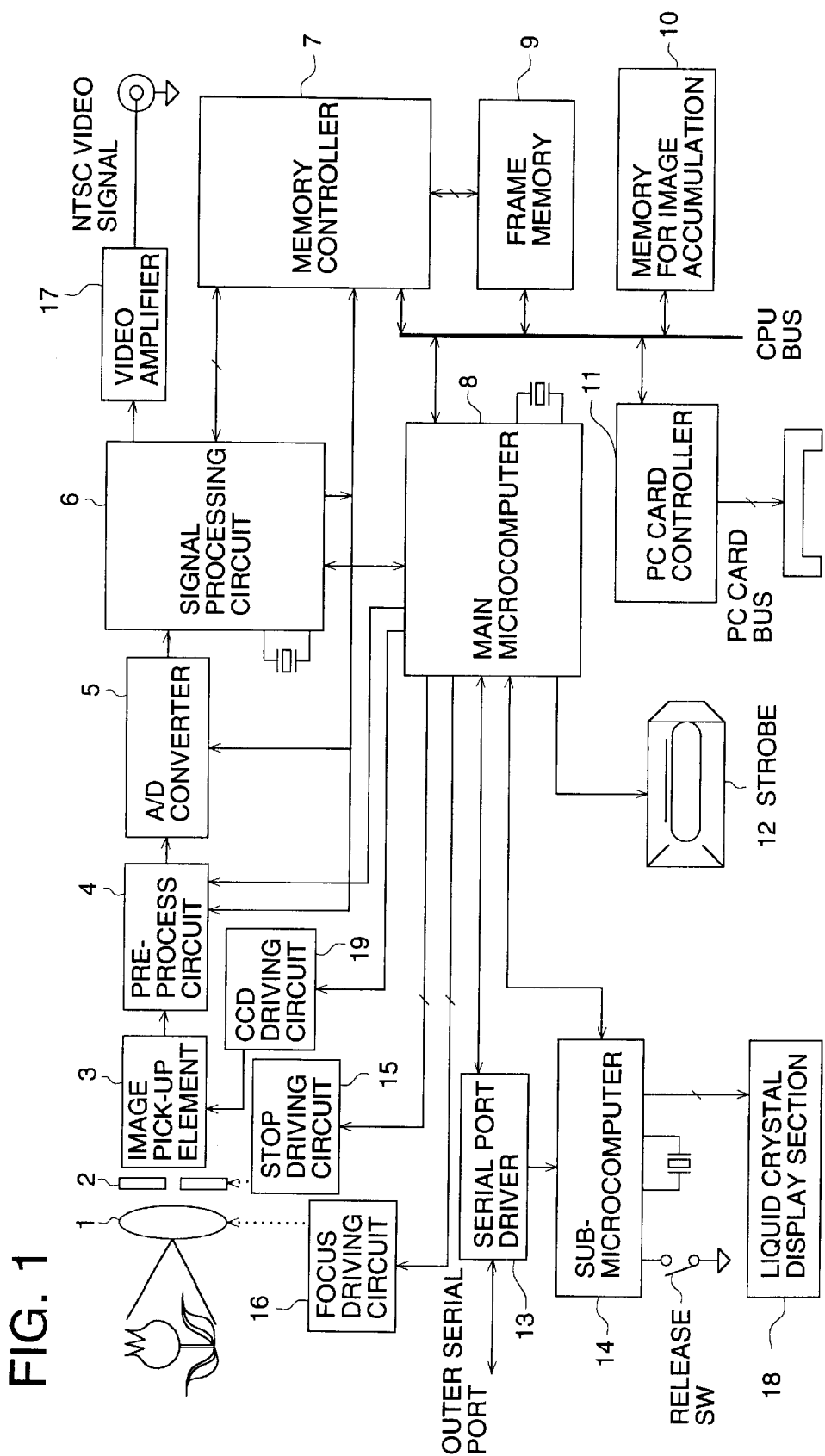
FIG. 1 is a functional block diagram showing the structure of a camera having a solid image pick-up element as a image receiving means used in an example of the present invention.

FIG. 1 is a functional block diagram showing an overall electric outline structure of the electronic still camera of the example of the present invention.

In the electronic still camera shown in FIG. 1, an optical image obtained through an optical system composed of a lens 1, an adjustable aperture 2, etc., is formed on the light receiving surface of the image pick-up element 3 such as CCDs, or the like. At that time, the lens 1 and the adjustable aperture 2 are respectively driven by a focus driving circuit 16 and a stop driving circuit 15. In this connection, the adjustable aperture 2 structures the first quantity of light control means.

Herein, the image pick-up element 3 photoelectrically converts the optical image formed on the light receiving surface into an electric charge amount, and outputs an analog image signal by the transmission pulse from an image pick-up element driving circuit 19. In this connection, the image pick-up driving circuit 19 can drive the image pick-up element 3 and also control the shutter speed, and structures the second quantity of light control means to limit the quantity of incident light without depending on the aperture area.

In the outputted analog image signal, the noise is decreased in a pre-process circuit 4 by CDS (correlative double sampling) processing, the gain is adjusted by the AGC, and 9 process for enlarging the dynamic range is conducted.

Then, after the analog image signal is converted into a digital image signal by an A/D converter 5, brightness processing and color processing are conducted in a signal processing circuit 6, and the processed signal is converted into a digital video signal (for example, a brightness signal (Y) and a chrominance signal (Cr, Cb)) and is outputted to a memory controller 7. Further, in the signal processing circuit 6, image signal processing to emphasize the high frequency component of the image signal is conducted at need.

On the other hand, in the signal processing circuit 6, a D/A converter is housed, and a colored image signal inputted from the A/D converter 5 side, or an image data reversely inputted from the memory controller 7 can also be outputted as an analog video signal.

Switching of these functions is conducted by data exchange with a main microcomputer 8, and the exposure information, a focus signal or a white balance signal of an image pick-up element signal can also be outputted to the main microcomputer 8 at need.

The main microcomputer 8 mainly controls the sequence of picture-taking, recording, and reproducing, and further, conducts compression reproducing of the photographed image, and the serial port transmission to the outside device at need. Herein, as the image compression method, the JPEG method or JBIG method which is standardized by CCITT and ISO, is used.

In the memory controller 7, digital image data inputted from the signal processing circuit 6 is accumulated in a frame memory 9, or reversely, image data in the frame memory is outputted to the signal processing circuit 6.

The frame memory 9 is an image memory in which image data more than at least one image plane can be accumulated, and for example, a VRAM, SRAM, DRAM, or the like is commonly used, however, herein, the VRAM which can move independently of the CPU bus is used.

A memory 10 for image accumulation is a memory housed in the main body, and an image data on which image compression processing or similar processing is conducted in the main microcomputer 8, in the image data stored in the frame memory 9 is accumulated. As the memory 10 for image accumulation, for example, a SRAM, DRAM, EEPROM, or the like is used, however, the EEPROM is preferable in consideration of the storage of image data in the memory.

A PC card controller (PCMCIA controller) 11 connects an external recording medium such as a PC memory card (hereinafter, it is simply abbreviated to a PC card) to the main microcomputer 8, and after image compression processing or the similar processing is conducted on the image stored in the frame memory 9 in the main microcomputer 8, the processed image is recorded in the external memory medium. As the external PC card for storage connected through the PC card controller 11, a SRAM card, DRAM card, or EEPROM card can be used, and image data can also be directly transmitted to a remote memory medium through the public telecommunication line by utilizing a modem card or an ISDN card.

Light emission timing of a strobe 12 can be obtained by the main microcomputer 8 which controls the picture-taking sequence.

A serial port driver 13 conducts signal conversion to conduct information transmission between the information of camera main body and the information of the external devices. As the serial transmission means, there is a recommended standard such as RS232C or RS422A to conduct the serial transmission, however, herein, RS232C is used.

A sub-microcomputer 14 controls man-machine interface such as operation switches of the camera main body, the liquid crystal display, and the like, and conducts information transmission to the main microcomputer 8 at need. Herein, a serial input/output terminal is used for information transmission to the main microcomputer 8. Further, clock function is incorporated in the sub-microcomputer 14, and an auto-date function is also controlled.

A stop driving circuit 15 is structured by, for example, an auto-iris or the like, and a stop value of an optical stop 2 is changed by the control of the main microcomputer 8.

A focus driving circuit 16 is structured by, for example, a stepping motor, and changes a lens position by the control of the main microcomputer 8 and focuses properly an optical focus plane of the object on the image pick-up element 3. Numeral 18 is a liquid crystal display section which is connected to the sub-microcomputer 14 and displays various information such as picture-taking information or the like.

In this connection, in the structure shown by FIG. 1, a case in which compression and expansion of the image are conducted in the main microcomputer 8, is shown, however, a circuit for exclusive use for compression/expansion may be arranged on the CPU bus.

[Basic Operations of the Electronic Still Camera]

Next, a series of operations from picture-taking to memory recording, will be described. The operation mode of the camera is set by information of each switch connected to the sub-microcomputer 14, and information for picture-taking is inputted into the main microcomputer 8 as serial information.

Corresponding to this information, the main microcomputer 8 sets the memory controller 7 and the serial port driver 13. When the release switch on the sub-microcomputer 14 is pressed, the sub-microcomputer 14 recognizes that the first switch signal S1 is active, sends the image input command to the signal processing circuit 6, and the signal processing circuit 6 operates the image pick-up element 3, pre-process circuit 4 and A/D converter 5, and receives image data.

The received image data is basically signal-processed in the signal processing circuit 6, focus information is made from high frequency components of brightness data, and exposure data is made from low frequency components. The main microcomputer 8 reads these data from the signal processing circuit 6, and conducts stop driving, focus driving, and further, gain control of an AGC amplifier in the pre-process circuit 4 at need, so that appropriate exposure and focus can be obtained. Further, depending on the operation mode, the analog image signal can also be outputted as an NTSC video signal from the signal processing circuit 6 through a video amplifier 17.

After the exposure value and the focus are converged to appropriate values, when a signal showing that the second release switch S2 is pressed, is inputted from the sub-microcomputer 14 to the main microcomputer 8, the main microcomputer 8 outputs a data taking-in command to the memory controller 7. Further, a light emission signal is also outputted to the strobe at field timing of the taken-in image at need. When the memory controller 7 receives the image taking-in command, the memory controller 7 detects a synchronous signal from the signal processing circuit 6, and takes image data such as Y, Cr, Cb type, outputted from the signal processing circuit 6, into the frame memory 9 at predetermined timing.

When the image has been taken into the frame memory 9, the memory controller 7 displays the status showing the completion of the taking-in of the image, and the main microcomputer 8 recognizes the completion of picture-taking, by reading it. After the completion of picture-taking, the main microcomputer 8 conducts image compression at need, and transmits image data to a memory 10 for image accumulation, IC card connected to the outside device, and a personal computer connected to the external serial port.

In the reproduction display operation, the main microcomputer 8 reads image data from the memory 10 for image accumulation, IC card connected to the outside device, and the personal computer connected to the external serial port, conducts image expansion at need, and writes it in the frame memory 9. After that, the image data is read by the signal processing circuit 6 and the memory controller 7, and the analog signal of the image is outputted to the output terminal through the signal processing circuit 6. Thus, each function of the camera of picture-taking, recording, reproducing, display and transmission is accomplished.

In the present example, it is discovered that a specific relationship exists between the pixel pitch of the CCD and the stop value relating to the image quality, and specifically, when the pixel pitch of the CCD is not larger than 7.0 μm, the present example is structured such that the stop value at the time of the minimum aperture of the adjustable aperture 2 is not larger than 5.6.

When the present example is structured as described above, even when the aperture stop is used to limit the quantity of light, a decrease of resolution and contrast due to the influence of diffraction can be suppressed to the minimum, and thereby, an electronic still camera in which the image quality is not deteriorated, can be realized.

Further, in the thus structured electronic still camera, when the stop value of the adjustable aperture 2 is set to not smaller than 5.6, processing to emphasize the high frequency component of the image signal is conducted in the signal processing circuit 6.

The emphasis processing of the high frequency component may be conducted by either of hardware or software. As the emphasis processing method of the high frequency component, various known methods can be used, however, by using a convolution filter, the high frequency component can be accurately processed. Further, as the emphasis processing method of the high frequency component, the Fourier transformation can also be used.

As the result in which such the emphasis processing of the high frequency component of the image signal is conducted, even when the stop not smaller than F5.6 is used to limit the quantity of light, the decrease of the resolution and contrast due to deterioration of MTF characteristics of the photographic optical system caused by the influence of diffraction can be compensated and suppressed to the minimum, thereby, the electronic still camera in which the image quality is not deteriorated, can be realized.

Further, as the stop value is increased, the deterioration of MTF due to diffraction is increased, and therefore, the degree of emphasis of the high frequency component is changed corresponding to the stop value. Specifically, the main microcomputer 8 may controls the camera so that the degree of emphasis is increased as the stop value is increased.

Figure 8:
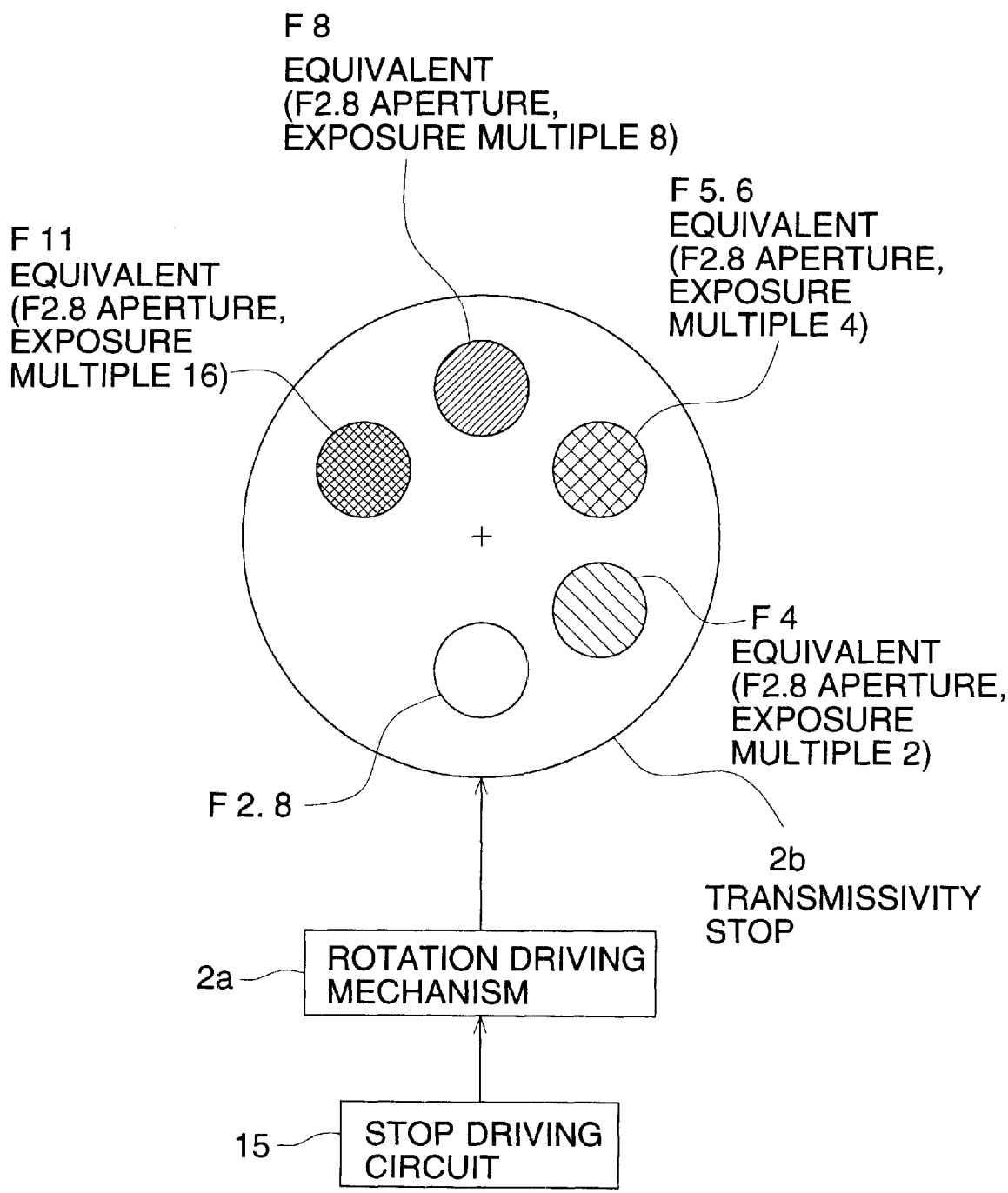
FIG. 8 is a structural view of another embodiment of the aperture transmissivity stop.

Further, as shown in FIG. 8, in place of the aperture stop 2 which controls the quantity of incident light by adjusting the aperture area, a ND filter which controls the quantity of incident light regardless of the aperture area may be used.

Furthermore, as the quantity of light control means, by using the quantity of light control means such as the adjustable aperture 2 which controls the quantity of incident light by controlling the aperture area, an ND filter to control the quantity of light without depending on the aperture area, the liquid crystal of variable transmissivity, and an electronic shutter, the camera is structured such that the stop value at the time of the minimum aperture of the adjustable aperture 2 is not larger than 5.6.

As being thus structured, even when the adjustable aperture 2 is used to limit the quantity of light, the decrease of the resolution and contrast due to deterioration of MTF characteristics of the photographic optical system caused by the influence of diffraction can be suppressed to the minimum, thereby, the electronic still camera in which the image quality is not deteriorated, can be realized. The quantity of incident light is controlled by jointly using the adjustable aperture 2 without depending on the aperture area 2, thereby, the quantity of light can be controlled in the wide range.

Further, as another example of the quantity of light control means, when the stop value of the adjustable aperture 2 to control the quantity of incident light by controlling the aperture area is not less than 5.6, the quantity of light control means is structured so as to jointly use the quantity of light control means such as the ND filter, the liquid crystal of variable transmissivity, or the electronic shutter, which controls the quantity of light without depending on the aperture area.

As being thus structured, even when the adjustable aperture 2 is used to limit the quantity of light, the decrease of the resolution and contrast due to deterioration of MTF characteristics of the photographic optical system caused by the influence of diffraction can be more suppressed than in the case of a single stop using the aperture area, thereby, the electronic still camera in which the image quality is not deteriorated, can be realized. The quantity of incident light is controlled by jointly using the adjustable aperture 2 without depending on the aperture area 2, thereby, the quantity of light is controlled in the wide range.

In the case as described above, when the pixel pitch of the CCD is 7.0 μm, a good effect is obtained, however, when the pixel pitch is not larger than 5.0 μm, a greater effect can be obtained.

EXAMPLE

Relating to the above-described embodiment, the detailed verification will be conducted below using Example and Comparative examples.

Figure 2:
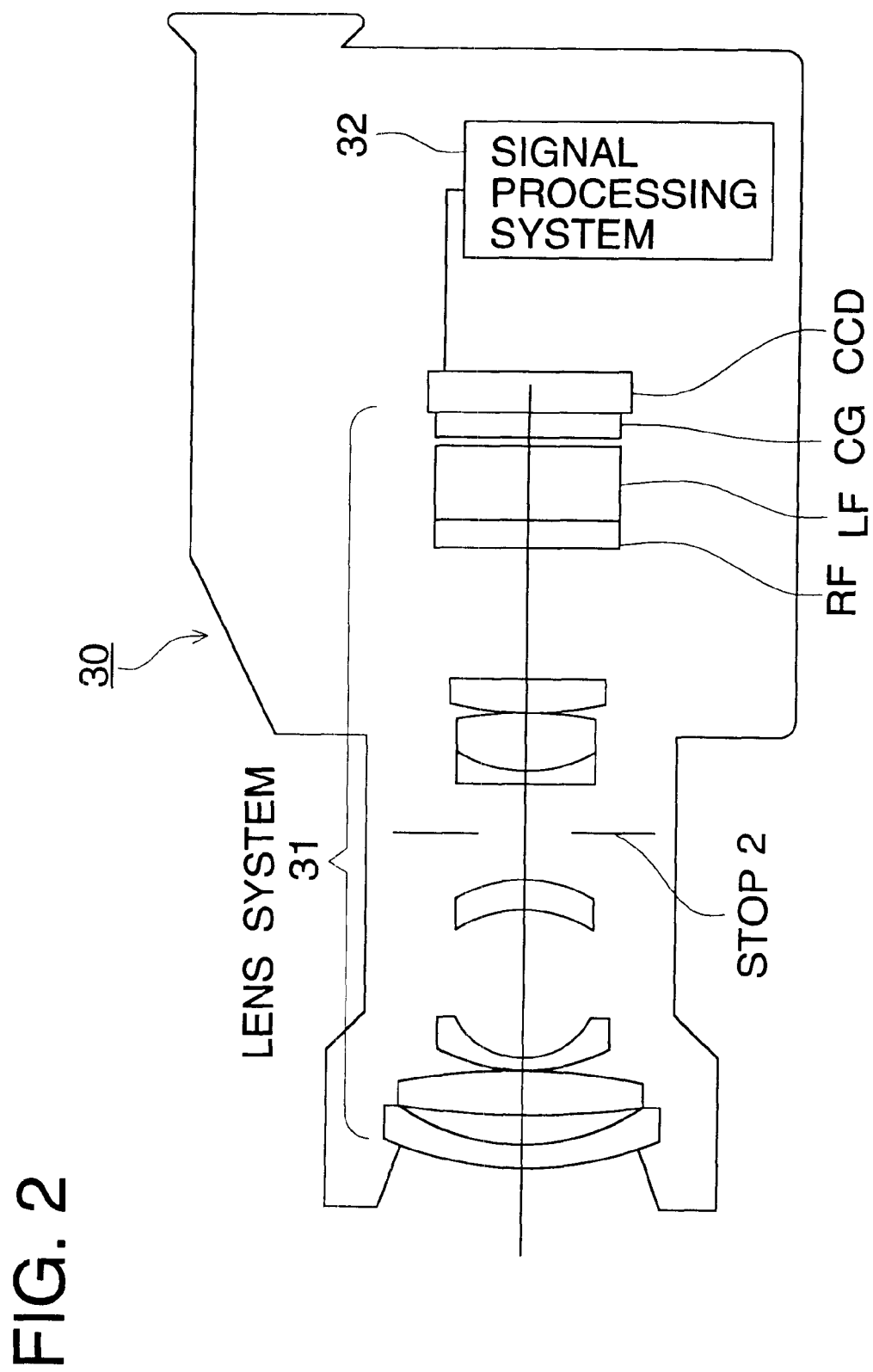
FIG. 2 is a lens arrangement view showing an optical outline structure of a camera having a solid image pick-up element as a image receiving means used in an example of the present invention.

FIG. 2 is a lens arrangement view showing the overall optical outline structure of the electronic still camera of Example of the present invention.

In FIG. 2, the electronic still camera 30 comprises a lens system 31 explained as the lens 1 in FIG. 1, the solid image pick-up element CCD, and a signal processing system 32 including the signal processing circuit explained in FIG. 1.

The optical system 31 is structured such that an object image passes through 7 group picture-taking lens, further passes through an infrared cut filter RF, an optical low pass filter LF, and a cover glass CG, and is formed on the solid image pick-up element CCD.

In the explanation of the Example, as the solid image pick-up element CCD used for evaluation as the present example and comparative example, the following are used.

(1) ICX084K (trade name) made by Sony Corporation light receiving surface ⅓ inches, approx. 330,000 pixels, pixel pitch 7.5 μm
(2) ICX089AK (trade name) made by Sony Corporation: light receiving surface ¼ inches, approx. 330,000 pixels, pixel pitch 5.6 μm (3) MN3773 (trade name) made by Matsushita Electronic Industry: light receiving surface 1/2.72 inches, approx. 1,000,000 pixels, pixel pitch 4.6 μm In this connection, the pixel pitch is a distance between the centers of 2 adjoining light receiving elements in the image pick-up element, and when the distance is different in the horizontal direction and in the vertical direction, the pixel pitch is the shorter distance.

Figure 3:
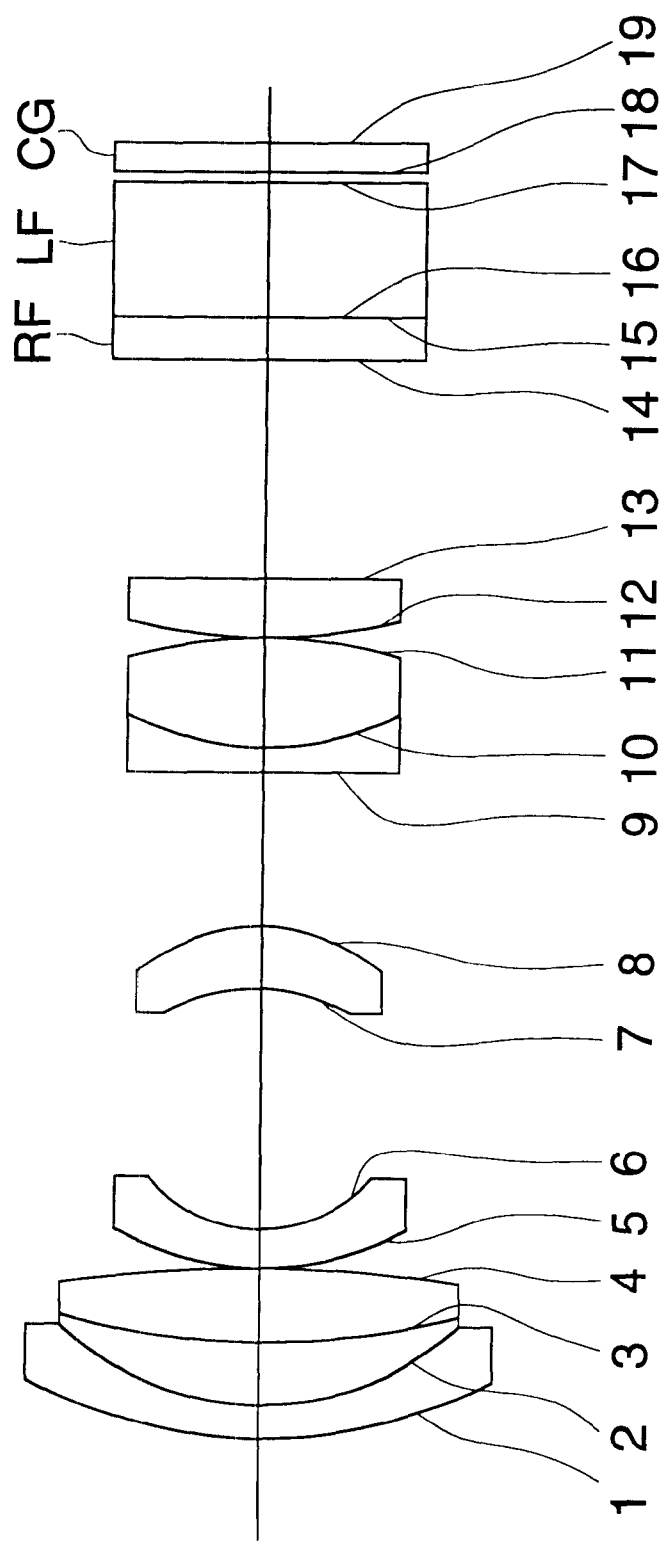
FIG. 3 is a sectional view of an optical system of a picture taking lens of an example of the present invention.

A sectional view of the optical system of the picture-taking lens used in the following examples is shown in FIG. 3. Optical data of the present example is shown in Table 1. In the present example, the aperture stop is located at a position of 1.2 mm at the back of the 8-th surface. Herein, "f" represents a focal length, "F" represents F-number (stop value), "R" represents a radius, "D" represents a distance (mm), "Nd" represents an index of refraction, "vd" represents Abbe number, and "P" represents the minimum pitch between pixels of solid photographing elements. The surface number of the lens in FIG. 3 corresponds to the surface number of the lens in Table 1. This picture-taking lens is the detailed concrete example of the above-described optical system 31.

TABLE 1

| f = 6.035 | | F = 2.8 | | |
|---|---|---|---|---|
| Surface No. | R | D | Nd | vd |
| 1 | 12.502 | 0.80 | 0.65844 | 50.9 |
| 2 | 7.757 | 1.50 | | |
| 3 | 23.343 | 1.70 | 1.80518 | 25.4 |
| 4 | −55.611 | 0.20 | | |
| 5 | 6.965 | 0.70 | 0.72000 | 50.2 |
| 6 | 3.436 | 6.06 | | |
| 7 | −5.912 | 1.50 | 1.58913 | 61.2 |
| 8 | −5.127 | 4.02 | | |
| 9 | 100.031 | 0.60 | 1.84666 | 23.8 |
| 10 | 6.788 | 2.60 | 1.77250 | 49.6 |
| 11 | 12.521 | 0.20 | | |
| 12 | 19.019 | 1.40 | 1.78590 | 44.2 |
| 13 | −89.125 | 5.31 | | |
| 14 | ∞ | 1.00 | 1.52000 | 65.0 *1 |
| 15 | ∞ | 0.00 | | |
| 16 | ∞ | 3.31 | 1.54880 | 67.0 *2 |
| 17 | ∞ | 0.20 | | |
| 18 | ∞ | 0.75 | 1.51633 | 64.1 *3 |
| 19 | ∞ | | | |

*1: infrared cut filter
*2: cover glass corresponding to the low pass filter
*3: cover glass The performance of the picture-taking lens is shown below.

Resolution (center)=more than 160 lines/mm

Resolution (peripheral)=more than 100 lines/mm

Figure 4:
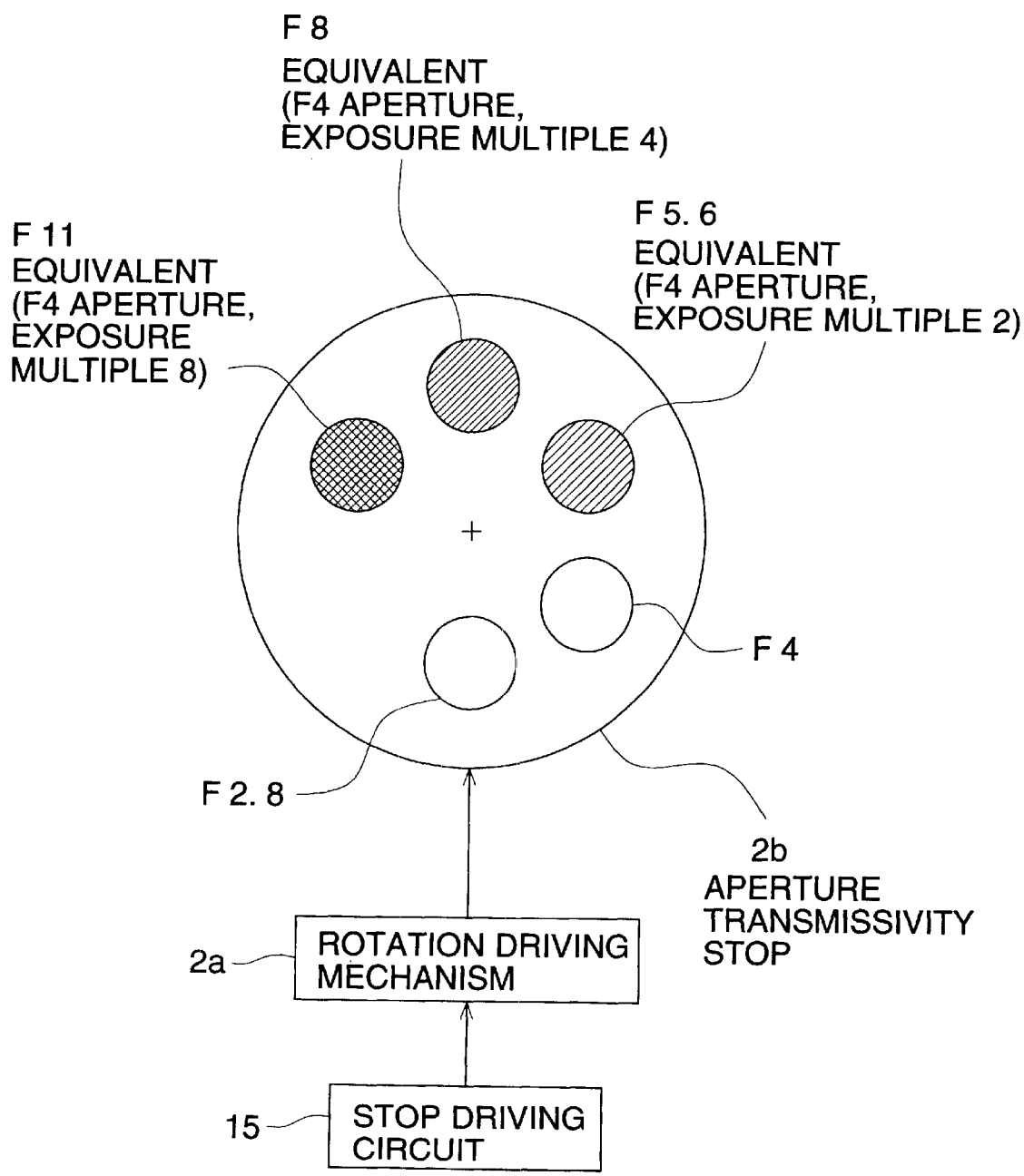
FIG. 4 is a structural view of an aperture_transmissivity stop used in an explanation of an example of the present invention.

Herein, 2×(1/(2P))=135 lines/mm 2.34×(1/(2P))=158.8 lines/mm 1.3×(1/(2P))=87.8 lines/mm As the adjustable aperture 2, an aperture_transmissivity stop 2b composed of an aperture of F2.8, an aperture of F4, an aperture of F4 provided with a filter of exposure multiple 2 (ND2)(F5.6 equivalence), an aperture of F4 provided with a filter of exposure multiple 4 (ND4)(F8 equivalence), and an aperture of F4 provided with a filter of exposure multiple 8 (ND8)(F11 equivalence), is used as shown in FIG. 4. Further, a rotation driving mechanism 2a controlled by the stop driving circuit 15 is provided to drive the aperture_transmissivity stop 2b.

Figure 5:
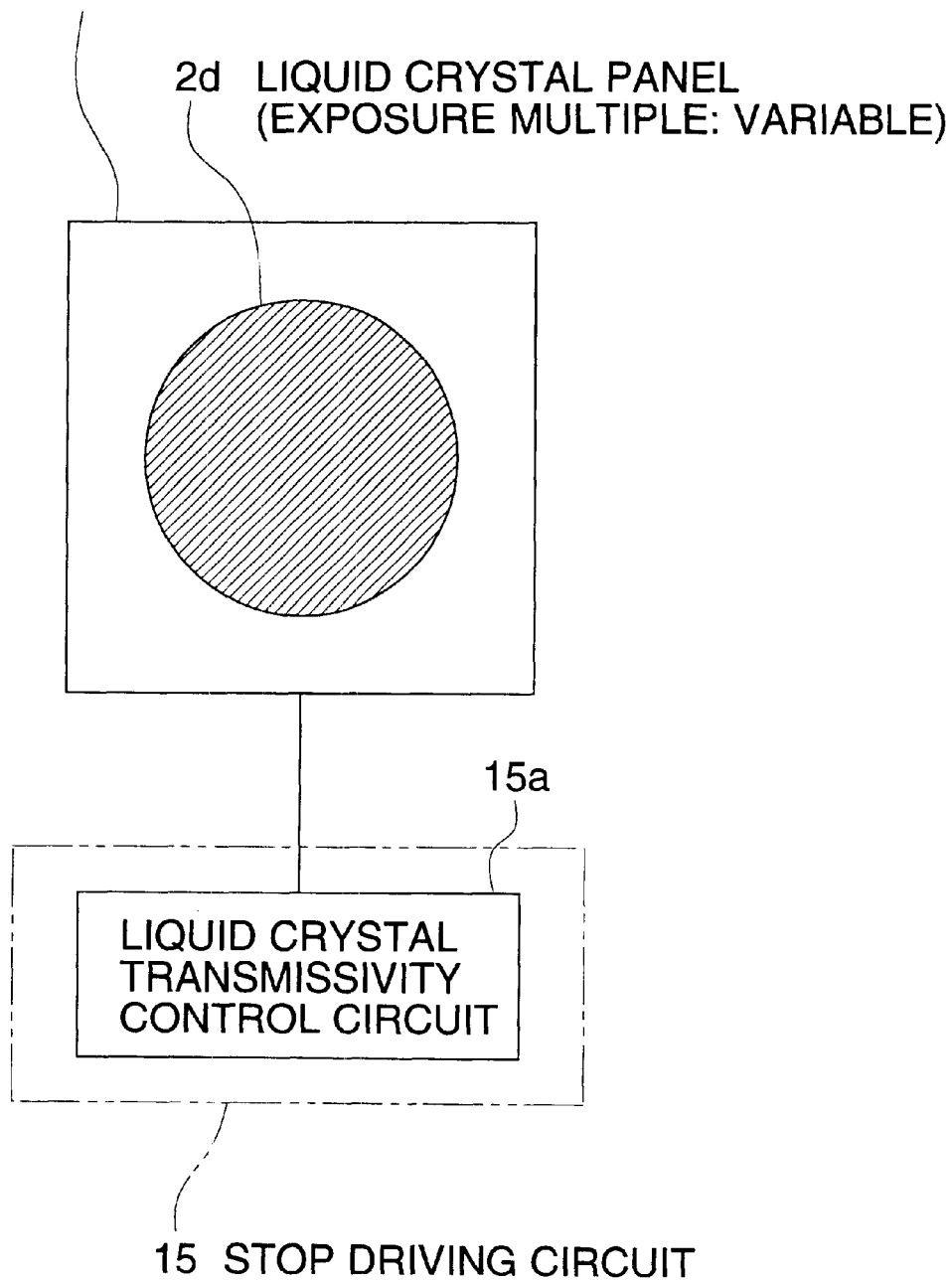
FIG. 5 is a structural view of the transmissivity stop used in an explanation of an example of the present invention.

Further, as another example of the quantity of light control means used jointly with the adjustable aperture 2 (transmissivity control means), a transmissivity stop 2c as shown in FIG. 5 is used. The transmissivity stop 2c is provided with a liquid crystal panel 2d whose exposure multiple (density) is variable, and the exposure multiple is controlled by a liquid crystal transmissivity control circuit 15a in the stop driving circuit 15, so that the quantity of incident light can be controlled without depending on the aperture area.

Figure 6:
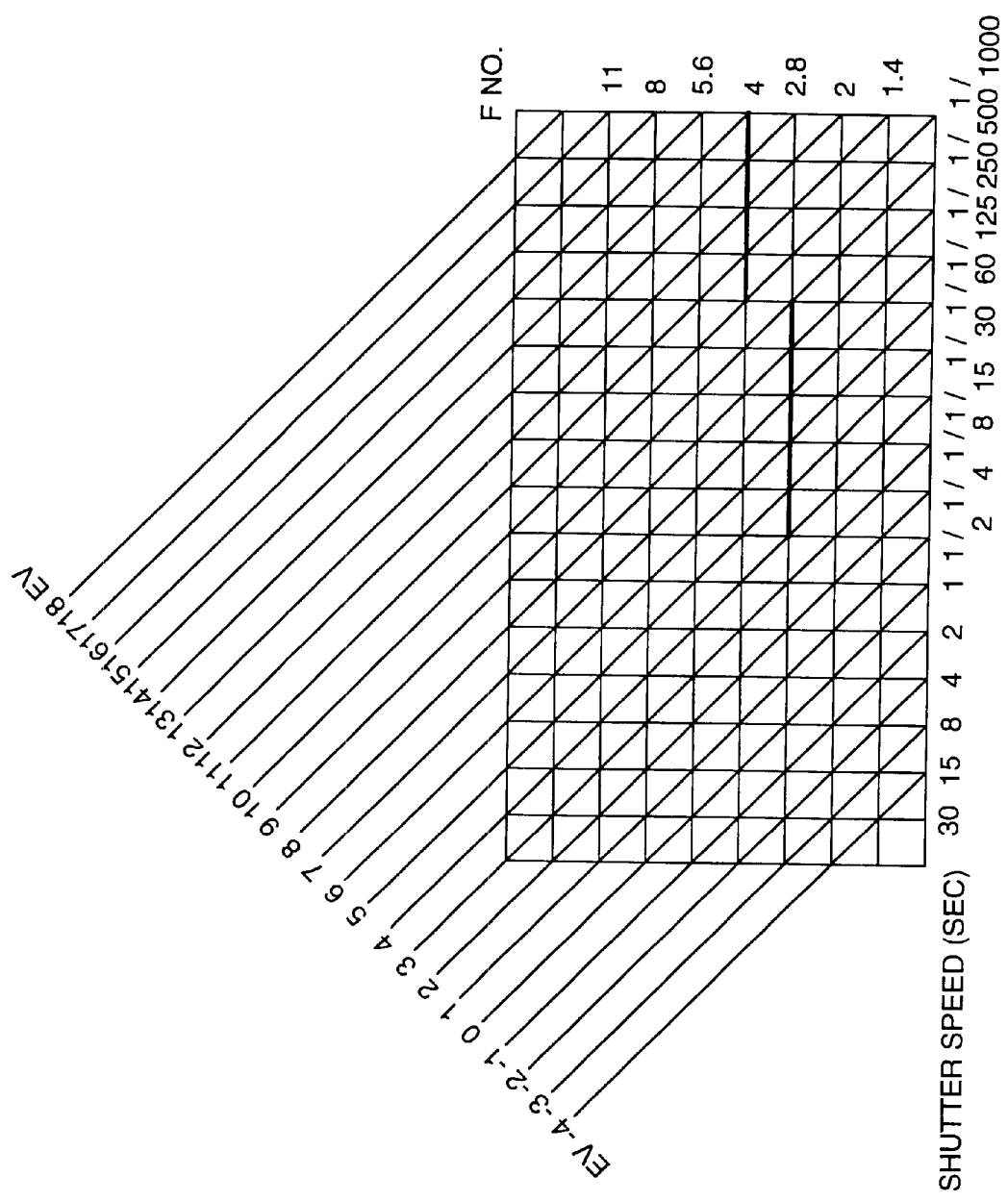
FIG. 6 is a program diagram of an electronic shutter used in an explanation of an example of the present invention.

Further, as a means to control the quantity of light without depending on the aperture area, a commonly known electronic shutter to control the electric charge accumulation time of CCD is also jointly used. For example, when the adjustable aperture 2 in which F2.8 and F4 can be switched, is provided, as shown in FIG. 6, in the brightness more than EV10, the quantity of light control is conducted by increasing the shutter speed to more than 1/60 sec.

Figure 7:
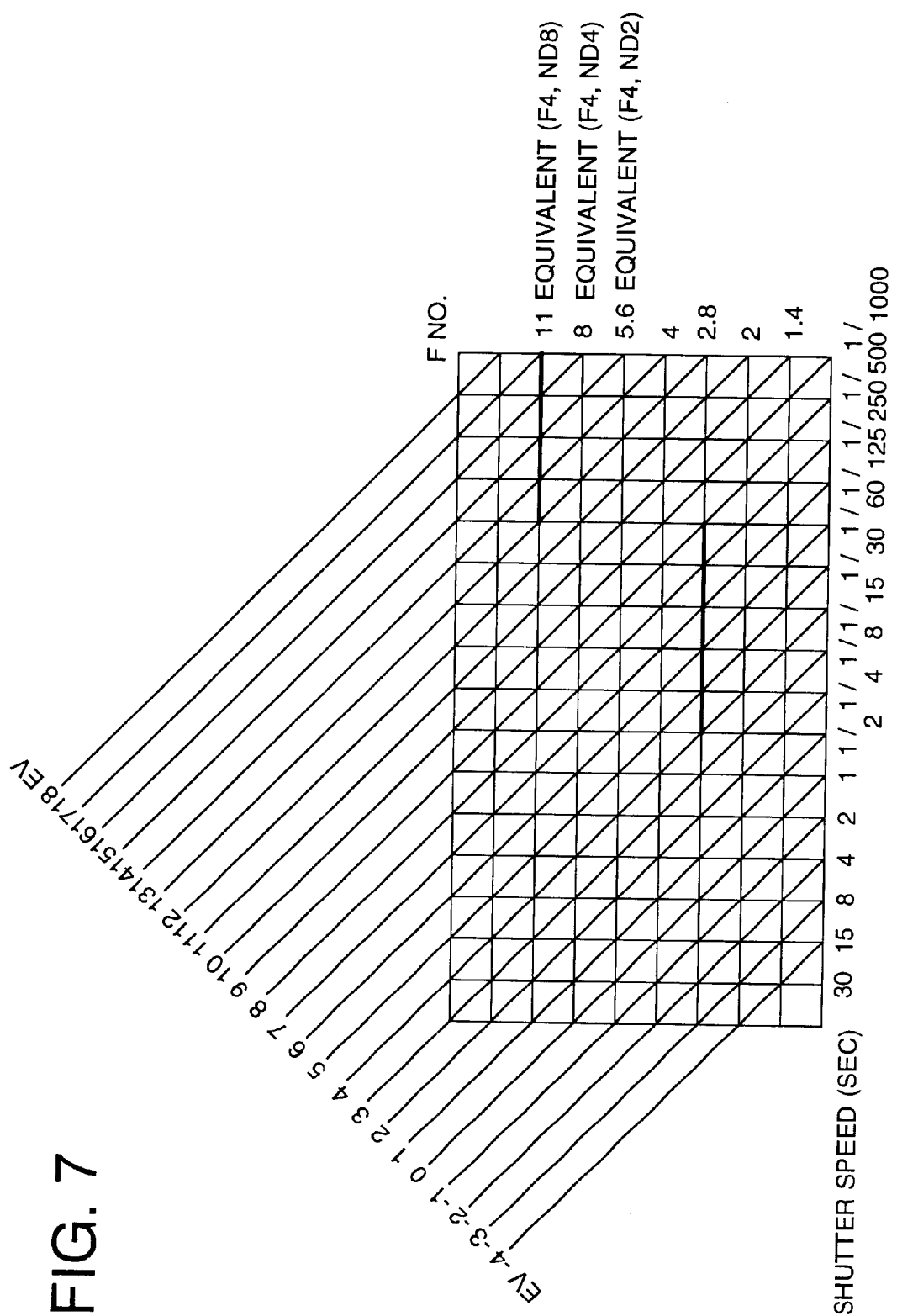
FIG. 7 is a program diagram of an electronic shutter used in an explanation of an example of the present invention.

Further, the above-described electronic shutter and the quantity of light control means to control the quantity of incident light without depending on the aperture area can be combined with each other. In that case, as shown in FIG. 7, F5.6 equivalence–F11 equivalence are controlled by the stop, and the quantity of light control of more than that value is conducted by the shutter speed.

Incidentally, as the comparative example, an adjustable aperture 2' which has the same mechanism as the adjustable aperture 2 shown in FIG. 4, the transmissivity is not controlled, and has the apertures of F2.8, F4, F5.6, F8 and F11, is prepared, and comparative data when the quantity of light control is conducted by only the aperture stop, is collected and compared.

[Image Quality Estimation]

Concerning the Example and Comparative example described above, the image of each example is relatively estimated by 10 valuers.

As an estimation method in this case, the resolution test chart is placed at a position of 2 m in front of the picture-taking lens, and the obtained image is outputted to the printer having sufficient resolution, and the resolution, sharpness, and acuity are totaled and estimated at 3 stages.

Incidentally, in the estimation, a mark (A) is good, (B) is slightly bad, and (C) is bad, and the estimation point A is as follows: (A)=+1 point, (B)=0 point, and (C)=−1 point.

(1) The case in which the stop value at the time of the minimum aperture is regulated:

The relationship between the stop value and the estimation point A in this case, is shown in Table 2.

TABLE 2

| The case in which the stop value is regulated: | | | | |
|---|---|---|---|---|
| Pixel pitch | | 7.5 μm | | |
| Stop value | 2.8 | 4 | 5.6 | 8 |
| Estimation point A | 2 | 2 | 2 | 2 |
| Pixel pitch | | 5.6 μm | | |
| Stop value | 2.8 | 4 | 5.6 | 8 |
| Estimation point A | 7 | 7 | 4 | 3 |
| Pixel pitch | | 4.6 μm | | |
| Stop value | 2.8 | 4 | 5.6 | 8 |
| Estimation point A | 9 | 9 | 4 | 3 |

As can clearly be seen from Table 2, in the case where the pixel pitch of the CCD is not larger than 7.0 μm, when th e stop value at the time of the minimum aperture is not larger than 5.6, even when the stop is used to limit the quantity of light, a decrease of the resolution and contrast of the image due to the deterioration of MTF characteristics of the photographic optical system caused by the influence of the diffraction can be suppressed to the minimum, and thereby, the image quality is not deteriorated.

Further, when the pixel pitch of the CCD is not larger than 5.0 μm, the effect to suppress a decrease of the resolution and contrast is more conspicuously seen.

Further, as comparative example, in the case where the pixel pitch of the CCD is not larger than 7.0 μm, when the stop value at the time of the minimum aperture is not smaller than 5.6, a decrease of the resolution and contrast is clearly seen, and it is recognized that the image quality is deteriorated.

When the pixel pitch of the CCD is not smaller than 7.0 μm, a decrease of the resolution and contrast due to diffraction is small, and therefore, an effect to improve the image quality as described above is not seen.

(2) The case where the high frequency component is emphasized corresponding to the stop value at the time of the minimum aperture:

The relationship between the stop value and the estimation point A in this case is shown in the following Table 3.

TABLE 3

The case where the high frequency component of the image is emphasized:

| Pixel pitch | 7.5 μm | | | |
|---|---|---|---|---|
| Stop value | 2.8 | 4 | 5.6 | 8 |
| Estimation point A | 2 | 2 | 2 | 2 |
| Pixel pitch | 5.6 μm | | | |
| Stop value | 2.8 | 4 | 5.6 | 8 |
| Estimation point A | 7 | 7 | 6 | 6 |
| Pixel pitch | 4.6 μm | | | |
| Stop value | 2.8 | 4 | 5.6 | 8 |
| Estimation point A | 9 | 9 | 7 | 6 |

As is clearly seen from Table 3, when the pixel pitch of the CCD is not larger than 7.0 μm, even when the stop value at the time of the minimum aperture is not smaller than 5.6, a decrease of the resolution and contrast due to the influence of diffraction can be suppressed to the minimum by emphasizing the high frequency component of the image signal, and the image quality is not deteriorated.

Further, when the pixel pitch of the CCD is not larger than 5.0 μm, the effect to suppress a decrease of the resolution and contrast is more conspicuously seen.

Further, when the pixel pitch of the CCD is not larger than 7.0 μm, if it is not executed that the stop value at the minimum aperture is not smaller than 5.6 and the high frequency component of the image signal is emphasized, a decrease of the resolution and contrast is seen as can clearly be seen from Table 2, and the image quality is deteriorated.

When the pixel pitch of the CCD is not smaller than 7.0 μm, a decrease of the resolution and contrast due to diffraction is small, and therefore, an effect to improve the image quality as described above is not seen.

(3) The case where the aperture stop at the time of the minimum aperture is regulated, and the transmissivity control is jointly used:

The relationship between the stop value and the estimation point A in this case is shown in the following Table 4.

TABLE 4

The case where the transmissivity control is jointly used (Minimum aperture aperture F4)

| Pixel pitch | 7.5 μm | | | |
|---|---|---|---|---|
| Stop value | 2.8 | 4 | 5.6 | 8 equivalence |
| Estimation point A | 2 | 2 | 2 | 2 |
| Pixel pitch | 5.6 μm | | | |
| Stop value | 2.8 | 4 | 5.6 | 8 equivalence |
| Estimation point A | 7 | 7 | 6 | 6 |
| Pixel pitch | 4.6 μm | | | |
| Stop value | 2.8 | 4 | 5.6 | 8 equivalence |
| Estimation point A | 9 | 9 | 8 | 8 |

As can clearly be seen from Table 4, in the case where the pixel pitch of the CCD is not larger than 7.0 μm, when the stop value at the time of the minimum aperture is not larger than 5.6 and the quantity of light control by the transmissivity control is jointly used, a decrease of the resolution and contrast due to the influence of diffraction can be suppressed to the minimum, thereby, the image quality is not deteriorated.

Further, when the pixel pitch of the CCD is not larger than 5.0 μm, such the effect to suppress a decrease of the resolution and contrast is more conspicuously recognized.

Further, in the case where the pixel pitch of the CCD is not larger than 7.0 μm, when the actual stop value at the minimum aperture is not smaller than 5.6, a decrease of the resolution and contrast is seen as can clearly be seen from Table 2, and it is confirmed that the image quality is deteriorated.

When the pixel pitch of the CCD is not smaller than 7.0 μm, a decrease of the resolution and contrast due to diffraction is small, and therefore, an effect to improve the image quality as described above is not seen.

(4) When the aperture stop at the minimum aperture and the transmissivity control are jointly used:

The relationship between the stop value and the estimation point A in this case is shown in the following Table 5.

TABLE 5

The case where the transmissivity control is jointly used

| Pixel pitch | 7.5 μm | | | |
|---|---|---|---|---|
| Stop value | 2.8 | 4 | 5.6 | 8 equivalence |
| Estimation point A | 2 | 2 | 2 | 2 |
| Pixel pitch | 5.6 μm | | | |
| Stop value | 2.8 | 4 | 5.6 | 8 equivalence |
| Estimation point A | 7 | 7 | 5 | 4 |
| Pixel pitch | 4.6 μm | | | |
| Stop value | 2.8 | 4 | 5.6 | 8 equivalence |
| Estimation point A | 9 | 9 | 6 | 5 |

As can clearly be seen from the Table 5, in the case where the pixel pitch is not larger than 7.0 μm, if the quantity of light control by the transmissivity control is jointly used when the stop value at the minimum aperture is not smaller than 5.6 and further the quantity of light control is conducted, a decrease of the resolution and contrast due to the influence of diffraction can be more suppressed than in the case of only the stop by the aperture area, and the image quality is not deteriorated. For example, F8 equivalence in this case is realized by the joint use of F5.6 and the quantity of light control, thereby, the influence due to diffraction is more decreased than in the case of only the stop by the aperture area.

Further, when the pixel pitch of the CCD is not larger than 5.0 μm, such the effect to suppress a decrease of the resolution and contrast is more conspicuously recognized.

Further, when the pixel pitch of the CCD is not smaller than 7.0 μm, a decrease of the resolution and contrast due to diffraction is small, and therefore, an effect to improve the image quality as described above is not seen.

In this connection, the optical system described in above Examples can be applied to all cameras (electronic still cameras, digital video cameras, etc.) in which the solid image pick-up element is used as the image receiving means, however, from the point of view in which the high quality is seriously considered and the stop is used, it is specifically appropriate for electronic still cameras.

[Effects of the Invention]

As detailed in the embodiment and examples, according to each invention described in the specification, the following effects can be obtained.

In the invention described in Item (1), when the pixel pitch of the solid image pick-up element is not larger than 7.0 μm, the stop value at the time of the minimum aperture of the stop means is not larger than 5.6, and as the result, even when the stop is used to limit the quantity of light, a decrease of the resolution and contrast due to the influence of the diffraction can be suppressed to the minimum, and thereby, a camera having a solid image pick-up element as a image receiving means which does not deteriorate the image quality can be realized.

In the invention described in Item (2), when the pixel pitch of the solid image pick-up element is not larger than 7.0 μm, and the stop value at the time of the minimum aperture of the stop means is not smaller than 5.6, processing to emphasize the high frequency component of the image signal is conducted, and as the result, even when a stop whose value is not smaller than 5.6 is used to limit the quantity of light, a decrease of the resolution and contrast caused by a decrease of the high frequency component due to the influence of the diffraction can be suppressed to the minimum, and thereby, a camera having a solid image pick-up element as a image receiving means which does not deteriorate the image quality can be realized. As the result, even when a stop is used to limit the quantity of light, a decrease of the resolution and contrast due to the influence of the diffraction can be suppressed to the minimum, and thereby, a camera having a solid image pick-up element as a image receiving means which does not deteriorate the image quality can be realized.

In the invention described in Item (3), when the pixel pitch of the solid image pick-up element is not larger than 7.0 μm, the stop value at the time of the minimum aperture of the first quantity of light control means is not larger than 5.6, and the second quantity of light control means to control the quantity of light without depending on the aperture area is used jointly with the first quantity of light control means. As the result, even when a quantity of light control means is used to limit the quantity of light, a decrease of the resolution and contrast due to the influence of the diffraction can be suppressed to the minimum, and thereby, a camera having a solid image pick-up element as a image receiving means which does not deteriorate the image quality can be realized.

Further, by using the second quantity of light control means without depending on the aperture area, sufficient resolution and contrast can be obtained even when the camera is used in the bright environment.

In the invention described in Item (4), when the pixel pitch of the solid image pick-up element is not larger than 7.0 μm, in the case where the quantity of light is further limited under the condition that the stop value of the first quantity of light control means is not smaller than 5.6, the second quantity of light control means to control the quantity of light without depending on the aperture area is used jointly with the first quantity of light control means. As the result, even when a quantity of light control means is used to limit the quantity of light, a decrease of the resolution and contrast due to the influence of the diffraction can be suppressed to the minimum, and thereby, a camera having a solid image pick-up element as a image receiving means which does not deteriorate the image quality can be realized.

Further, by using the second quantity of light control means without depending on the aperture area, sufficient resolution and contrast can be obtained even when the camera is used in the bright environment.

In the case that photographing is conducted by CCD having a small pixel pitch, if a filter is used for controlling light amount, the influence caused by diffraction can be reduced.

In the case of printing an image, since it may be easy for human eyes to recognize the deterioration of image quality due to the diffraction, the present invention may be more preferably applicable to a still camera.

What is claimed is:

1. A camera, comprising:

a photographing lens for focusing an optical image onto an image forming surface;

a light amount controlling device comprising a first light amount controlling member for adjusting an area of a photographing aperture so as to control a light amount of the optical image and a second light amount controlling member for controlling a light amount of the optical image regardless of the area of the photographing aperture;

photographing elements, provided on the image forming surface, for photoelectrically converting the optical image of a subject into image signals, the photographing elements arranged with an arrangement pitch not larger than 7.0 μm; and a signal processing device for processing the image signals;

wherein the light amount controlling device starts using the second light amount controlling member when the light amount is further reduced after F-number becomes 5.6 or more by using the first light amount controlling member.

2. The camera of claim 1, wherein the light amount controlling device includes a diaphragm on which the photographing aperture is provided.

3. The camera of claim 1, wherein the second light amount controlling member is a ND (Neutral Density) filter.

4. The camera of claim 1, wherein the second light amount controlling member is a transmittivity controlling member capable of changing the density thereof.

5. The camera of claim 1, wherein the second light amount controlling member is a shutter speed controlling member for the photographing elements.

6. The camera of claim 1, wherein the signal processing device corrects an influence caused by diffraction of the optical image having passed through the photographing aperture.

7. The camera of claim 1, wherein the signal processing device conducts a process to emphasize high frequency components of the image signals.

8. The camera of claim 7, wherein the signal processing device changes the extent to emphasize the high frequency component of the image signals in accordance with the F-number.

9. The camera of claim 1, wherein the F-number is kept to be not more than 5.6.

10. The camera of claim 1, wherein the arrangement pitch is not larger than 5.0 $\mu$m.

* * * * *